Jan. 11, 1966 B. DRAKE ET AL 3,229,040
TELEPHONE EXCHANGE SYSTEMS
Filed Feb. 19, 1962 4 Sheets-Sheet 1

Jan. 11, 1966 B. DRAKE ETAL 3,229,040

TELEPHONE EXCHANGE SYSTEMS

Filed Feb. 19, 1962 4 Sheets-Sheet 2

Jan. 11, 1966 B. DRAKE ETAL 3,229,040
TELEPHONE EXCHANGE SYSTEMS
Filed Feb. 19, 1962 4 Sheets-Sheet 4
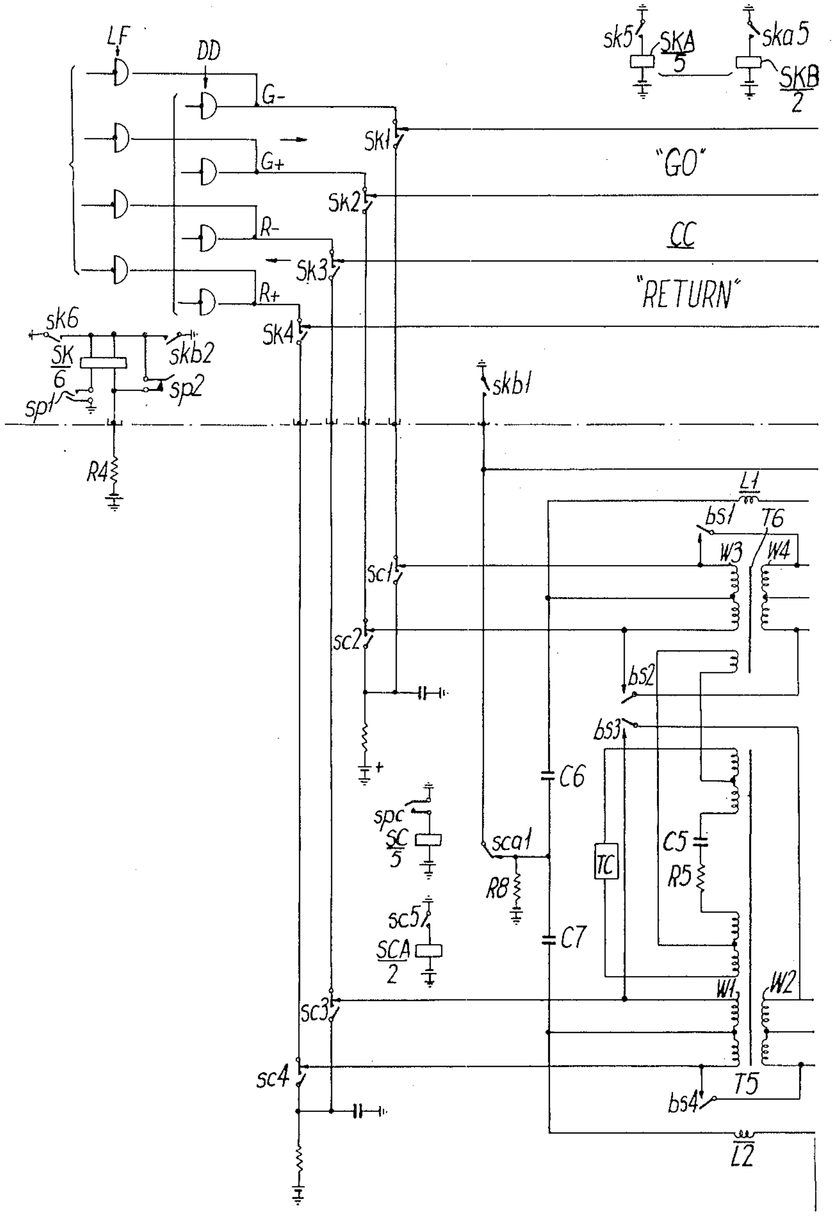

3,229,040

TELEPHONE EXCHANGE SYSTEMS

Bernard Drake, Blackheath, London, and Sydney Francis Smith, Barnehurst, Kent, England, assignors to Associated Electrical Industries Limited, London, England, a British company Filed Feb. 19, 1962, Ser. No. 173,952
Claims priority, application Great Britain, Mar. 10, 1961, 8,853/61
8 Claims. (Cl. 179—27)

This invention relates to telephone exchange systems and is especially but not exclusively applicable to telephone systems of the kind wherein junction and/or trunk lines terminating at a telephone switching centre (e.g. trunk exchange) are interconnected on a four-wire basis at the switching centre to provide a through connection having "go" and "return" transmission paths.

Switching centres in telephone exchange systems of the kind referred to usually comprise terminal equipments (hereinafter referred to as incoming and outgoing terminal equipments) that serve for terminating incoming and outgoing junction or trunk lines, respectively. Incoming and outgoing two-wire lines (e.g. junction lines) for example, may conveniently be terminated by hybrid transformers facilitating the setting up of four-wire through connections between pairs of two-wire lines or between two and four-wire lines by switching means (i.e. selectors and/or relays) provided at the switching centre.

These terminal equipments may comprise pads (i.e. gain controlling apparatus) and associated switching means for effectively switching said pads in or out of the transmission paths for the purpose of modifying the effective transmission loss of a through connection, according to requirements.

With a view to ensuring that the transmission performance of these through connections is not adversely affected by contacts of the switching means interconnecting the incoming and outgoing terminal equipments and/or of the pad switching means if provided, direct currents are fed over the legs of the "GO" and "RETURN" transmission paths to effect so called wetting of these contacts to ensure that they present a uniform low contact resistance to the passage of speech currents. This wetting current may be caused to flow in response to the application of suitable potentials to the transmission paths, said paths being isolated as regards the flow or direct current from the incoming and outgoing lines either by the aforesaid terminating hybrid transformers or by input or output transformers of amplifiers in the case of amplified four-wire trunk lines. Pads are sometimes conveniently connected in circuit by means of plug and socket connections; thus it becomes necessary for the co-operating contacts of these connections likewise to be continuously wetted by the passage of direct current therethrough if consistently good transmission performance is to be achieved.

As regards the selective operation of the pad switching means (e.g. relays) to provide the requisite transmission efficiency of a through connection, this may be effected, as may also the contact wetting described above, by direct current signalling over so-called phantom circuits formed in part by the transmission paths, or by loop or leg direct current signalling over these paths.

To ensure the flow of adequate contact wetting current through contacts in the connection of a transmission path it may be necessary to break through high resistance films on these contacts. The high resistance films may comprise oxide films in the case of base metal contacts (e.g. nickel silver) but where the contacts comprise precious metals, then although the particular metal employed may not be subject to oxidation, high resistance films may nevertheless be produced on the contacts as a result of atmospheric contamination for example.

For certain connections at an exchange the potentials normally applied to the transmission paths for contacts wetting and pad switching, if required, may be sufficiently large to break down such high resistance films on any of the contacts in the connections. For instance, in the case of four-wire through connections at a transit trunk exchange between amplified four-wire trunk lines, in which the "go" and "return" transmission paths are separately employed for contacts wetting and pad switching purposes (i.e. where only one pad switching path is required) it is possible to arrange for earth potential to be applied at one end of each of the transmission paths while full battery potential (e.g. —50 v.) is applied to the other end of said paths for all forms of through connection, irrespective of whether the connection is a straight through connection between incoming and outgoing terminal equipments or whether it is a revertive connection between outgoing terminal equipments set up via a revertive selector. Operation or non-operation of a pad switching relay connected at one end of the path used for pad switching purposes will thus depend on whether resistance connected in circuit at the other end of the pad switching path has a high or low ohmic value. By arranging that transformer windings terminating the ends of the "go" and "return" transmission paths at the exchange each have a pair of mutually equivalent winding parts interconnected through a blocking capacitor and by applying the full earth and full battery potentials referred to above to junctions between the mutually equivalent winding parts and the blocking capacitors at the respective ends of the transmission paths full battery potential (i.e. 50 volts) will be available for breaking down high resistance films on any of the contacts connected in the respective legs of the transmission paths.

If, however, a further path is required for pad switching purposes (e.g. for controlling the connection of deattenuation pads in circuit) and pad switching is to be effected by phantom direct current signalling over the paths as distinct from leg signalling, then both pad switching and contacts wetting will need to be performed over common paths. This may be achieved by applying intermediate potentials (i.e. potentials between full earth and full battery) to the respective transmission paths in the incoming terminal equipment and by applying full earth or full battery potential to these paths in the outgoing terminal equipment so that for straight through connections the current that flows in the respective legs of the transmission paths is at least sufficient for contacts wetting purposes. For revertive connections, however, the potentials applied to the ends of corresponding transmission paths in the respective outgoing terminal equipments may be the same for certain forms of connection so that it becomes necessary to apply potentials to the transmission paths in the revertive selector circuit in order to ensure that sufficient current for contacts wetting purposes and for pad switching, if required, is caused to flow in the respective legs of the transmission paths.

The voltages that are produced across the connections between the revertive selector and the outgoing terminal equipments may be insufficient for initially breaking down high resistance films on contacts in the connections although they are quite adequate for contacts wetting purposes.

In its broadest aspect, therefore, the present invention provides, in a telephone exchange system in which potentials that will be applied for contacts wetting and/or pad switching purposes to the respective sides of a switching connection in a transmission path at an exchange are insufficient to insure the breakdown of high resistance films on any of the contacts of the connection, means effective for producing a voltage surge over the switching connection in order to ensure such breakdown.

In carrying out the invention the transmission path may have centre-tapped transformer windings connected across it on the respective sides of the switching connection with the centre taps on said windings being connected to suitable circuitry for producing the voltage surge over the switching connection. Between the centre tap on one of these transformer windings and full battery potential a capacitor may be connected in series with a high impedance, while a further capacitor may be connected between earth and the centre tap on the other transformer winding. The high impedance serves for limiting a surge over the switching connection when the connection is initially set up, but responsively to the subsequent application of earth potential such as through operated relay contacts to the junction of the high impedance and its associated capacitor a voltage surge of considerable energy is applied over the switching connection to breakdown high resistance films that may be present on any of the contacts of the connection. Wetting current for the contacts of the connection and pad switching current, if required, may be derived from suitable potentials applied to the centre taps on the respective transformer windings and these potentials will be applied through resistances and/or pad switching relays, according to transmission requirements.

The present invention as applied to a four-wire through connection at a trunk exchange will now be described by way of example with reference to the accompanying drawings in which.

Figure 1:
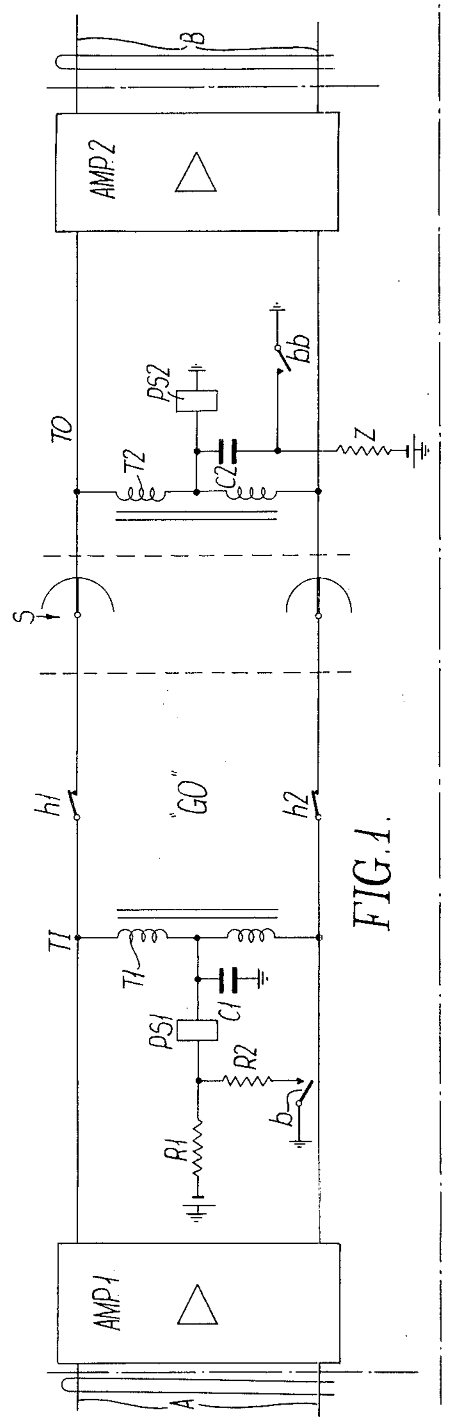
FIG. 1 shows the "go" transmission path only of a four-wire straight through transit connection at a trunk exchange between incoming and outgoing four-wire amplified trunk lines.

Referring to FIG. 1 of the drawings, incoming and outgoing four-wire trunk lines (only two wires of each trunk line being indicated at A and B) terminating on incoming and outgoing terminal equipments TI and TO are interconnected on a four-wire basis by a selector switch S.

The incoming terminal equipment TI includes, in respect of the incoming wires A, an amplifier AMP 1, a transformer comprising centre-tapped winding T1 connected across the output wires from the amplifier and relay switching contacts *h*1 and *h*2. The outgoing terminal equipment TO includes in respect of the outgoing pair of wires B an amplifier AMP2 and a transformer comprising centre-tapped winding T2 connected across the pair of input wires to the amplifier AMP2.

Connected between earth and the centre tap of the transformer winding T1 in the incoming terminal equipment TI is a capacitor C1. The junction between this capacitor C1 and the centre tap of winding T1 is connected to negative battery (−50 v.) via a pad switching relay PS1 for controlling de-attenuation pads (not shown) and a resistor R1. The junction between the resistor R1 and the relay PS1 may be connected to earth through a resistor R2 and make contact *b* of a relay (not shown). The centre tap of the transformer winding T2 in the outgoing terminal equipment TO is connected to negative battery (−50 v.) through a capacitor C2 and a high impedance Z which may be constituted by a high non-inductive resistance or a relay or relays. The centre tap of the winding T2 is connected to earth via a pad switching relay PS2 also for controlling de-attenuation pads (not shown). Earth potential may be connected to the junction between the capacitor C2 and the impedance Z by the operation of a make contact *bb* of a relay (not shown).

The operation of the circuit arrangement illustrated in FIG. 1 is as follows:

Consequent upon the seizure of the incoming terminal equipment TI the make contact *b* operates to complete a potential divider circuit comprising resistors R1 and R2 between earth and negative battery (−50 v.) A potential between full earth and full battery, say 12.5 volts, is accordingly applied to the centre tap of transformer winding T1. When the selector switch S has been set for connecting up the outgoing terminal equipment TO to the incoming terminal equipment TI and the relay switching contacts *h*1 and *h*2 have closed a current should flow over the legs of the transmission path for contacts wetting purposes and through the switching relays PS1 and PS2 in series. If it is assumed that de-attenuation is not required than the current flowing for contacts wetting will be insufficient to produce operation of the pad switching relays. The capacitors C1 and C2 being charged to different voltages will produce a surge when they are connected in series between earth and negative battery consequent upon the closure of contacts *h*1 and *h*2 but this surge will be restricted to a negligible value by the high impedance Z. Consequently, even if contacts *h*1 and *h*2 fail to close simultaneously then only a negligible transverse surge will be produced in the transformer windings T1 and T2, thereby avoiding the possibility of overloading common amplifiers to the extent of producing noise or causing transmission interruptions on other signalling or conversational circuits. After completion of the connection between the incoming and outgoing terminal equipment TI and TO the potential of the bottom plate of the capacitor C2, as viewed in the figure, builds up to substantially the full battery potential (i.e. −50 v.) so that when the outgoing terminal equipment TO becomes seized over signalling wires (not shown) and relay contacts *bb* close earth potential is applied to the bottom plate of capacitor C2 thereby causing a voltage surge of substantially 50 volts to be produced over the switching connection in the transmission path to the earth return of the capacitor C1. If the selector switch contacts and the relay switching contacts *h*1 and *h*2 connected in the legs of the transmission path over the switching connection between the transformer windings T1 and T2 are of low resistance then the only transverse voltage surge that will be produced in the transformer windings T1 and T2 will be due to normal resistance unbalance.

If, however, the selector switch contact in series with contact *h*1 has a high resistance than the upper leg of the transmission path will be virtually open-circuited so that the transformer windings T1 and T2 will be connected in auto-transformer fashion. Consequently the occurrence of the 50 volt surge across the lower tapped portions of the windings T1 and T2 will result in a voltage surge rising to approximately 100 volts being developed across the high resistance selector switch contact and this voltage will serve to break down the high resistance oxide or other film on the contact so rapidly that the transverse surge inevitably produced in the transformer windings T1 and T2 will be of a negligible order. When the voltage surge has disappeared, wetting current for the contacts in the legs of the connection between the transformers is maintained over the circuit including pad switching relays PS1 and PS2. As has been previously mentioned the pad switching relays PS1 and PS2 serve for controlling de-attenuation pads (not shown). These pads will conveniently be connected in circuit on the respective switching sides of the transformers so that pad switching contacts (i.e., contacts of pad switching relays PS1 and PS3) and plug and socket contacts of the pads if the latter are of the plug-in type, are supplied with wetting current. Although these pads by being connected between the transformer windings T1 and T2 will reduce the magnitude of the 100 volts surge referred to above it will be appreciated that this surge is superimposed on a steady state voltage and a peak voltage of at least 50 volts can be expected. This will be quite sufficient to break down high resistance films on any of the contacts in the connection.

If both of the selector switch contacts in the connection have high resistances then consequent upon breakdown of the high resistance films on one of these contacts the transformer windings T1 and T2 will function as auto-transformers as mentioned above so that the high resistance film on the other switching contact will be broken down substantially simultaneously thereby avoiding the occurrence of an appreciable transverse surge in the transformers.

When the connection between the equipments TI and TO is released the transverse surge produced in the transformers can be kept to a negligible order by arranging that the relay switching contacts *h*1 and *h*2 open before the contact *bb* so that the centre taps on the windings T1 and T2 are connected to earth via capacitors C1 and C2, respectively, when the connection is released.

Figure 2:
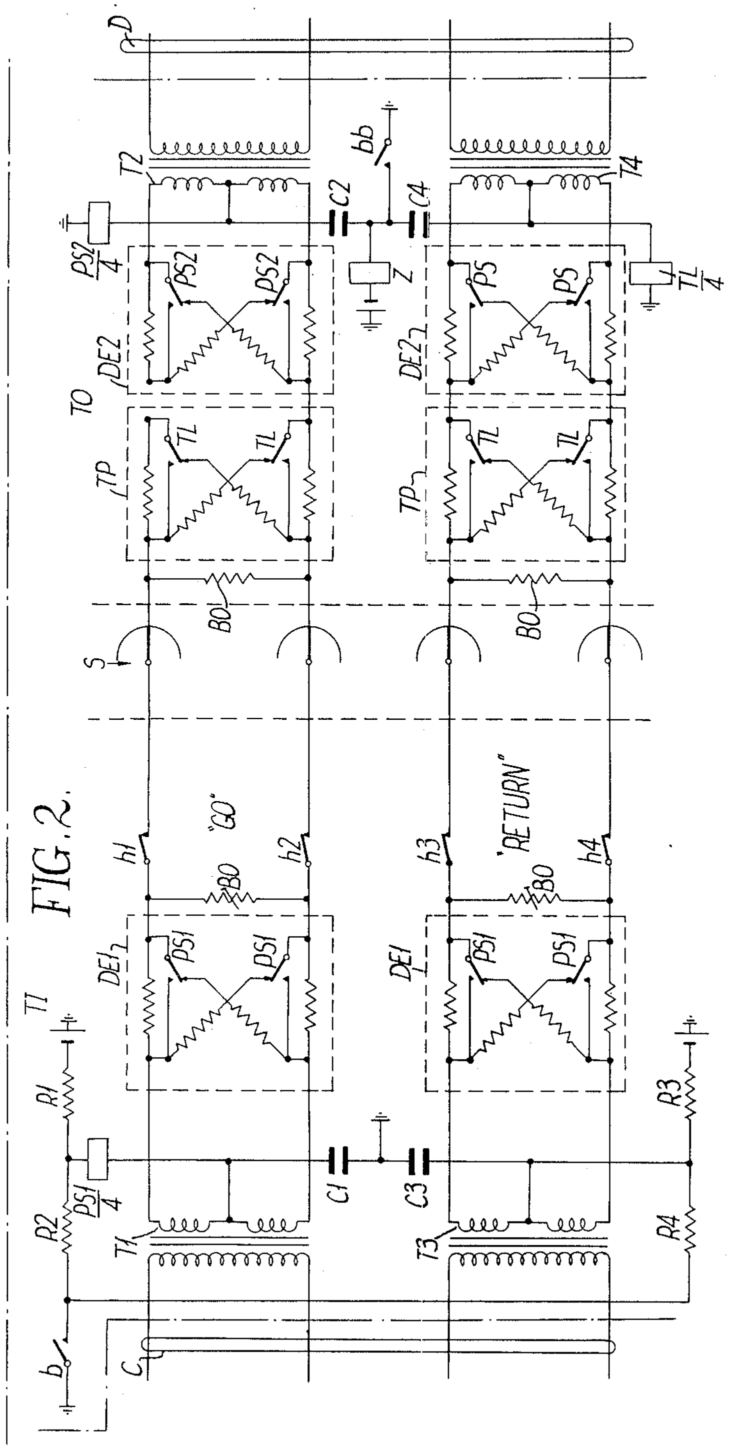
FIG. 2 shows a four-wire straight through transit connection at a trunk exchange between incoming and outgoing four-wire trunk lines; and, FIG. 3 shows a manual board circuit arrangement for setting up through connections between trunk lines via a connecting circuit.

Turning now to FIG. 2 of the drawings, transformers having centre-tapped windings T1, T2, T3 and T4 serve for terminating incoming and outgoing four-wire trunk lines C and D. These transformers which form part of the incoming and outgoing trunk terminating equipment TI and TO may comprise the input and output transformers of voice-frequency signalling equipment. The respective terminal equipments are connected together on a four-wire basis to provide "go" and "return" transmission paths through a selector switch S and relay switching contacts *h*1 to *h*4. De-attenuation pads DE1 and DE2 and transit pads TP are arranged on the switching sides of the transformer windings T1 to T4. The centre taps on the transformer windings T1 and T3 are connected to earth via capacitors C1 and C3, respectively, the centre tap on the winding T1 also being connected to negative battery (—50 v.) through a pad switching relay PSI for controlling the de-attenuation pads DEI and a resistor R1 while the centre tap of the winding T3 is connected also to negative battery (—50 v.) via a resistor R3. Resistors R2 and R4 are connected in series between the junction of the resistor R1 and the pad switching relay PS1 and the junction between the resistor R3 and the capacitor C3. The junction between the resistors R2 and R4 may be connected to earth via a make contact *b* of a relay (not shown) operable when the incoming terminal equipment TI is seized.

The centre taps on the transformer windings T2 and T4 are connected to earth respectively through a pad switching relay PS2 controlling the de-attenuation pads DE2 and through a transit pad switching relay TL controlling the transit pads TP. The centre tap of winding T2 is connected to negative battery via a capacitor C2 and a high impedance Z while the centre tap of winding T4 is connected via a capacitor C4 to the junction of capacitor C2 and the impedance Z. Earth potential may be connected to the junction of capacitors C2 and C4 in response to the closure of contacts *bb* of a relay (not shown) operable in response to the seizure of the outgoing terminal equipment TO.

When de-attenuation is not required as will be assumed for the present example the values of the resistors R1 and R2 may be so chosen that a potential of 12.1 volts, say, is applied through the pad switching relay PS1 to the centre tap of the winding T1 upon the seizure of the equipment TI and consequent closure of contact *b*. When the connection is set up between the incoming and outgoing terminal equipments TI and TO, current flows through the pad switching relays PS1 and PS2 in series, with the current dividing substantially equally between the two legs of the "go" transmission path (assuming that all the contacts contained in the connection have a low resistance). This current although it will be sufficient for wetting the various contacts contained in the legs of the transmission path will not produce operation of the relays PS1 and PS2 since de-attenuation is not required.

The resistors R3 and R4 may have the same resistance values so that a potential of —25 v. (i.e., one half full negative battery potential) is applied to the centre tap of the winding T3 when contact *b* closes. The resistor R3 has a high resistance value compared with that of R1 so that when the connection is completed between incoming and outgoing terminal equipment TI and TO the currents flowing through the legs of the "return" transmission path although they are adequate for contacts wetting purposes are insufficient when combined at the centre tap of the transformer winding T4 to produce operation of the transit pad switching relay TL. Thus the transit pads TP remain connected in circuit.

As will be seen from the figure, the pads employed are of the lattice type so that the pad switching relay contacts contained in the transverse arms of the pads are wetted by the current flowing in the legs of the transmission paths. Furthermore, if the pads are of the plug-in type, the plug and socket contacts will also be wetted by the current flowing in the legs of the transmission paths.

Resistors BO are connected across the wires of the "go" and "return" transmission paths on each side of the switch S. These resistors may be adjusted to build up the switching loss of each trunk end to a definite value, say 0.5 db, according to transmission requirements.

Upon the seizure of the outgoing terminal equipment TO after closure of switching contacts *h*1 to *h*4 the contact *bb* closes and applies earth potential to the lower and top plates of the capacitors C2 and C4 respectively, having a potential of approximately —50 volts. Thus surges of approximately 50 volts are simultaneously applied to the "go" and "return" transmission paths over the switching connection. If the selector switch contact in one of the legs of the "go" or "return" transmission path presents a high resistance due to the presence of a high resistance oxide or other film on the contact then the relevant leg will be open-circulated and pads connected in circuit on either side of the high resistance selector switch contact will be virtually unterminated. Prior to the generation of the voltage surge in response to the closure of contact *bb* a steady voltage will be present across the high resistance film and the surge voltage will accordingly be superimposed upon this steady voltage. Since the pads are virtually unterminated the attenuating effect they have on the voltage surge is somewhat less than if they were terminated and the peak voltage appearing across the high resistance contact should be of the order of 50 volts which is sufficient to break down the high resistance film.

The circuit arrangement shown in FIG. 2 is intended for use in a system in which selector switches for providing a through connection are set up step by step by means of trains of impulses (e.g. loop/disconnect pulses) transmitted over a pair of signalling wires (not shown). When access to a register is required for code translation purposes the digital code information will be transmitted over the signalling wires which will be temporarily connected to the register. As soon as the outgoing terminal equipment TO is seized by the register over the signalling wires contact *bb* will close to produce the necessary voltage surge over the connection between the incoming and outgoing terminal equipments.

If, however, digital information is transmitted to the register in the form of multi-frequency pulses (i.e. one multi-frequency pulse per digit) or where another mode of rapid voice-frequency signalling to the register is employed it would be necessary in order to provide the requisite number of pulse-carrying wires to the register to divert at least the wires of the "go" transmission path of the incoming terminal equipment to the register as well the signalling wires. In this system the register would include a multi-frequency or other rapid signalling receiver, as appropriate, the input transformer of which would be arranged similarly to the transformer on the switching side of amplifier AMP2 in FIG. 1 so that when the register was seized a voltage surge would be produced over the connection between the diverted wires of the "go" path in the incoming terminal equipment and the register to break down any high resistance films on contacts in the connection to the register, with wetting current being supplied over the connection. If information then had to be transmitted from the register over seized outgoing terminal equipment and its associated trunk line by multi-frequency pulses the multi-frequency signals would be sent from the register via a transformer arranged in similar fashion to that shown on the left hand side of FIG. 1 so that a voltage surge would already have been initiated over the connection between the register and the outgoing terminal equipment consequent upon the seizure of the terminal equipment by the register.

Upon the register clearing the wires of the incoming terminal equipment diverted to the register will be switched through to the corresponding wires of the seized outgoing terminal equipment with wetting current then flowing in the legs of the transmission paths due to the potentials applied to the centre taps of the transformer windings T1 and T3 and T2 and T4.

FIG. 2 shows a transit trunk connection between incoming and outgoing four-wire trunk lines. In the case, however, of a trunk originating exchange where it is required to connect an incoming switched two-wire junction to an outgoing four-wire trunk line the incoming terminal equipment would include a two to four-wire terminating set including a transmission bridge enabling loop signalling to be effected over the incoming two-wire switched junction for breaking down high resistance oxide or other films on any of the switched contacts and for supplying wetting current to these contacts. The four-wire side of the terminating set would be connected to the outgoing terminal equipment over relay contacts, such as those shown at *h*1 to *h*4 in FIG. 2. The outgoing terminal equipment would be arranged substantially as that shown at TO in FIG. 2, while transformers connected on the four-wire side of the two to four-wire terminating set may facilitate the provision of contacts wetting and pad switching current in similar fashion to the transformer contained in the incoming terminal equipment TI in FIG. 1.

Figure 3:
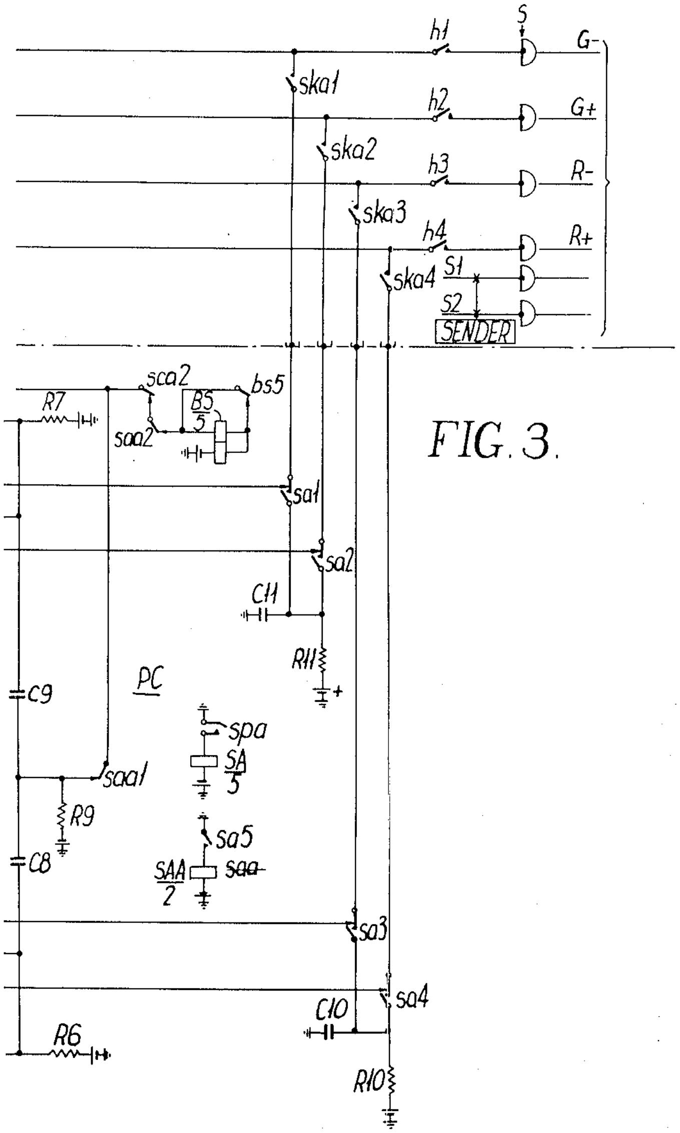

Referring now to FIG. 3 of the drawings, this shows a manual board circuit arrangement comprising at the top of the figure a connecting circuit CC to which access can be obtained by a calling subscriber over an incoming four-wire trunk line and incoming terminating equipment, such as that shown at TI in FIG. 2, and via a demand distributor switch DD. The connecting circuit CC includes an operator's speak key having contacts *sp*1 and *sp*2, which the operator operates to respond to a calling condition on the connecting circuit. In operating the speak key an operating circuit will be completed for a relay SK over contacts *sp*1. When relay SK operates, an operating circuit is then established for a relay SKA over contacts *sk*5 and relay SKA when it operates completes an operating circuit for a relay SKB over contacts *ska*5.

Contacts *sk*1, *sk*2 and *sk*3, *sk*4 connect two pairs of wires G—, G+ and R—, R+ from incoming terminal equipment (not shown) through to the operator's position circuit PC while contacts *ska*1 to *ska*4 connect the four-wires on the right hand side of the connecting circuit CC through to the position circuit PC. The switched wires from the incoming terminal equipment are coupled to the operator's telephone circuit TC by a four-wire to two-wire conversion set comprising a hybrid transformer T5 having associated with it a balancing network consisting of a resistor R5 and a capacitor C5, and an impedance matching transformer T6. The hybrid transformer T5 has a pair of centre-tapped windings W1 and W2 which are connected, respectively, to the "return" path wires R— and R+ extended through to the position circuit PC over contacts *sk*3 and *sk*4 and contacts *sc*3 and *sc*4 of a speak call relay SC, and via contacts *sa*3 and *sa*4 and *ska*3 and *ska*4 to the "return" path wires R— and R+ on the right of the figure which will be extended to an outgoing trunk terminal equipment and associated trunk line over relay switching contacts *h*3 and *h*4 and selector switch S (i.e. manual board first trunk selector or distributor). The impedance matching transformer T6 includes centre-tapped windings W3 and W4, the winding W3 being connected via contacts *sc*1 and *sc*2 and contacts *sk*1 and *sk*2 to the "go" transmission path wires G—, G+, while the centre-tapped winding W4 is connected via contacts *sa*1 and *sa*2 of a speak answer relay SA and contacts *ska*1 and *ska*2 to the "go" transmission path wires G— and G+ that will be extended to the outgoing trunk terminal equipment over relay switching contacts *h*1 and *h*2 and the selector switch S.

The centre taps on windings W1 and W2 are connected together through a choke L2 and, for contacts wetting over connections from the position circuit PC to the incoming and outgoing terminal equipments via the "return" path wires R— and R+, positive battery is applied to the junction between the choke L2 and the centre tap on winding W2 through a resistor R6. The centre taps on the windings W3 and W4 of the impedance matching transformer T6 are similarly connected together via a choke L1 with positive battery being connected for contacts wetting over connections between the position circuit and the "go" transmission path wires G— and G+ to the junction between the centre tap on winding W4 and the choke L1 via a resistor R7.

The windings W1 and W3 are connected together through capacitors C6 and C7, the junction between which is connected to negative battery through a high resistance resistor R8. This resistor R8 serves the same purpose as the high impedance Z in the FIG. 1 and FIG. 2 circuit arrangements, namely that of restricting to negligible values transverse surges produced in the transformers in the position circuit and incoming terminating equipment as a result of disparity between the times of closing of the contacts *sk*1 and *sk*2 or *sk*3 and *sk*4. The centre taps on the windings W2 and W4 are likewise connected together through capacitors C8 and C9, the junction between which is taken to negative battery through a transverse surge limiting resistor R9 having a high resistance value. The junction between the capacitors C6 and C7 is interconnected with that of the capacitors C8 and C9 via break contact *sca*1 of relay SCA operable in response to the operation of speak/call relay SC and via break contact *saa*1 of relay SAA which is operable in response to the operation of speak/answer relay SA.

If when the operator throws her speak key the speak/call key having contact *spc* and speak/answer key having contact *spa* are unoperated (as shown), then an earth potential will be applied from the operated make contact *skb*1 to the junctions of the capacitors C6 and C7 and C8 and C9. The potentials on the interconnected plates of the capacitors are thus changed suddenly from approximately —50 volts to earth potential so that independent voltage surges will be produced over the two paths extending back to the incoming terminal equipment (not shown) in order to breakdown high resistance films on any of the contacts in the connection. Wetting current is supplied by the positive battery connected to the centre taps of windings W1 and W3 via resistors R6 and R7.

The voltage surges produced by earthing the interconnected plates of the capacitors C8 and C9 may be ineffective at this stage since a connection may not have yet been set up from the position circuit PC to an outgoing trunk circuit.

The closure of contact *skb*1 completes the operating circuit for a slow-to-operate relay BS over contacts *sca*2 and *saa*2. The operator may throw her speak/answer key for example to ascertain the required call subscriber's number over the conversational circuit extending back through the incoming terminal equipment, and by so doing the operating circuit for relay BS is disconnected at contacts *saa*2 in response to the operation of relay SAA upon the operation speak/answer relay SA.

The operator then proceeds to pick up an outgoing trunk terminal equipment and associated trunk at the right-hand extremity of the connecting circuit CC by dialling or keying the required subscriber's number via sender "SENDER" over signalling wires S1 and S2. When the outgoing trunk terminal equipment, which may be as shown at TO in FIG. 2, is seized, the earthing of the capacitors connected to the centre taps of the terminating transformer in the outgoing equipment will cause voltage surges to be returned over the paths of the connection extending via selector switch S and operated contacts *h*1 to *h*4 to earthed capacitors C10 and C11 in order to breakdown high resistance films on any of the contacts in the connection from the seized outgoing terminal equipment to the position circuit PC. If, however, the speak/answer key had been restored directly after the wanted number had been ascertained, the voltage surges would have been returned from the seized outgoing terminal equipment to the capacitors C8 and C9. With the speak/answer key restored relays SA and SAA release and complete the operating circuit for slow-to-operate relay BS. When relay BS operates after its operating lag contacts *bs*1 to *bs*4 serve to connect windings W1 and W2 and W3 and W4 of the transformers T5 and T6 in parallel. By so doing the resistances of the windings of transformers T1 and T2 and the chokes L1 and L2 are removed from the legs of the "go" and "return" transmission paths, now extending through the position circuit, for the purpose of obtaining desired values of pad switching currents flowing between the interconnected incoming and outgoing terminal equipments and also to reduce the transmission loss of the transformers T5 and T6 to transverse speech currents in the "go" and "return" speech paths. The restoration of the operators speak key causes relays SK, SKA and SKB to release so that the incoming and outgoing terminal equipments then become interconnected through the connecting circuit CC instead of through the operators position circuit PC. Make-before-break contacts *sk*1 to *sk*4 ensure that the connection between the terminal equipments is uninterrupted during the transfer of the connection to the connecting circuit.

In the case where the calling subscriber books a call with an operator over the connection set up from the incoming terminal equipment to the operator's position circuit PC and then clears down the operator may dial the required number into the sender equipment and then restore the speak key leaving the sender equipment to set up the outgoing side of the required connection. When the selected outgoing trunk terminal equipment is seized the surges produced by the earthing of capacitors are ineffective since the contacts *ska*1 to *ska*4 are open and the incoming circuit has been cleared down. However, in response to notification that the outgoing side of the connection has been completed the operator will reoperate her speak key and the earth applied to the capacitors C8 and C9 over contact *skb*1 will cause surges to be produced over the connection between the operator's position circuit PC and the seized outgoing terminal equipment for breaking down high resistance films on any of the contacts in the connection and thereafter the contacts in the connection are maintained in a wetted condition by current fed over the connection.

The operator then rings back the calling subscriber over an outgoing trunk circuit via a revertive selector having a line finder LF associated with it. The "go" and "return" transmission paths in the revertive selector circuit need to be crossed in order to ensure that the "go" and "return" transmission paths in the called outgoing terminal equipment will be connected to the corresponding paths in the calling outgoing terminal equipment when a connection is established between the two equipments via the revertive selector.

The resistors R6 and R7 in the operator's position circuit will be so chosen that the pad switching arrangements for the outgoing terminal equipments connected to the operator's circuit via a revertive selector will be the same as for a straight through connection. When the operator receives an indication that the calling outgoing terminal equipment has been seized the throwing of her speak key will serve to produce voltage surges over the connection by the earthing of the capacitors C6 and C7 over contact *skb*1. These voltage surges break down high resistance films on any of the contacts in the connection to the calling outgoing terminal equipment. Both outgoing terminal equipments (i.e. calling and called) will be connected together through the connecting circuit CC when the operator restores her speak key.

From the foregoing description of the circuit arrangement shown in FIG. 3 it will be apparent that voltage surges are produced on any of the connections set up between the operator and one or both of the called and calling subscribers or between both of the subscribers and that these surges are superimposed on steady voltages for maintaining the contacts of the connection in a wetted condition following the collapse of the surges.

What we claim is:

1. In a telephone exchange system a switching arrangement comprising a transmission path having at least one pair of conductors, switching contacts connected in said conductors, means for applying different potentials to the transmission path on respective sides of said contacts for producing a current through said contacts when closed, and voltage surge-producing means connectable to the transmission path for applying a voltage surge through said conductors for effecting breakdown of high resistance films on said contacts, transformers having center-tapped transformer windings of said transformers connected between a pair of conductors on the respective sides of the switching contacts and center taps on said windings connected, respectively, to the voltage surge-producing means.

2. In a telephone exchange system a switching arrangement as claimed in claim 1, comprising amplifiers connected to the pair of conductors on respective sides of the switching contacts, incoming and outgoing amplified lines connected to said amplifiers, and transformers in said amplifiers for isolating as regards direct current, said pair of conductors from said incoming and outgoing amplified lines.

3. In a telephone exchange system a switching arrangement as claimed in claim 1 in which the voltage surge-producing means comprises a capacitor, a high impedance connected in series with said capacitor between the center tap on one of said center-tapped transformer windings and a source of one potential and a further capacitor connected between a source of different potential and the center tap on another of said center-tapped transformer windings, switching means for applying said different potential to the junction of said high impedance and its series connected capacitor, said high impedance acting to limit the magnitude of a voltage surge over said switching contacts when the transmission path is initially set up.

4. In a telephone exchange system a switching arrangement as claimed in claim 3, comprising a relay for operating following completion of the transmission path and contacts of said relay serving to apply said different potential to the junction between the high impedance and its series connected capacitor.

5. In a telephone exchange system a switching arrangement as claimed in claim 1, comprising sources of potential for providing contacts wetting current for the switching contacts and electrical resistance connected between said sources and said center taps.

6. In a telephone exchange system a switching arrangement as claimed in claim 5, comprising a pad switching relay connected in one of the connections between said sources of potential and the center taps of the transformer windings, and contacts of said pad switching relay being wetted by current derived from said sources.

7. In a telephone exchange system a switching arrangement comprising a transmission path having at least one pair of conductors, switching contacts connected in said conductors, means for applying different potentials to the transmission path on respective sides of said contacts for producing a current through said contacts when closed, and voltage surge-producing means connectable to the transmission path for applying a voltage surge through said conductors for effecting breakdown of high resistance films on said contacts, terminal equipments between which extends said transmission, path center-tapped transformer windings in said terminal equipments, a manual board operator's position circuit, center-tapped transformer windings in said position circuit, said voltage surge-producing means being associated with center taps of said windings for applying voltage surges over said switching contacts.

8. In a telephone exchange system a switching arrangement as claimed in claim 7, comprising a connecting circuit for interconnecting the terminal equipments via the transmission path and for by-passing said operator's position circuit.

References Cited by the Examiner

UNITED STATES PATENTS

| | | | |
|---|---|---|---|
| 1,250,152 | 12/1917 | Eisenmann | 307—137 |
| 1,785,818 | 12/1930 | Peterson et al. | 179—27 |
| 2,647,165 | 7/1953 | Buchner | 179—18 |

ROBERT H. ROSE, *Primary Examiner.*

WILLIAM C. COOPER, *Examiner.*